A. D. SCOTT.
METHOD OF WINDING AND THE PRODUCT THEREOF.
APPLICATION FILED AUG. 13, 1912.

1,167,722.

Patented Jan. 11, 1916.
5 SHEETS—SHEET 1.

Witnesses:

Inventor
Archibald D. Scott
By his Attorneys Gifford & Bull

A. D. SCOTT.
METHOD OF WINDING AND THE PRODUCT THEREOF.
APPLICATION FILED AUG. 13, 1912.
1,167,722.
Patented Jan. 11, 1916.
5 SHEETS—SHEET 2.
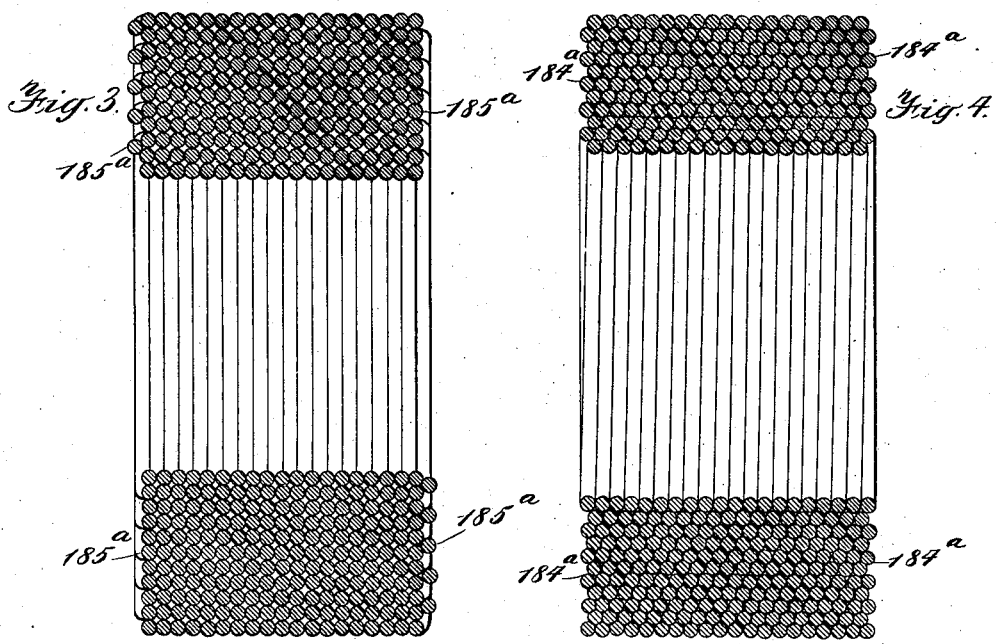
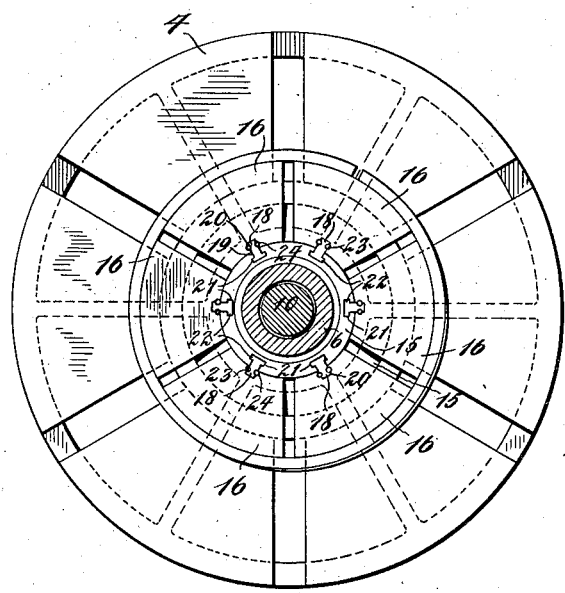
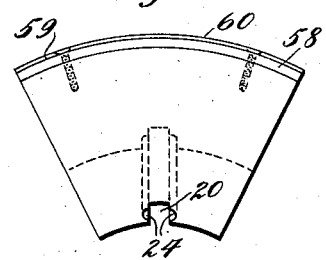
Witnesses:
Geo. C. Cheney
Lis. A. Pauling
Archibald D. Scott  Inventor
By his Attorneys Gifford & Bull

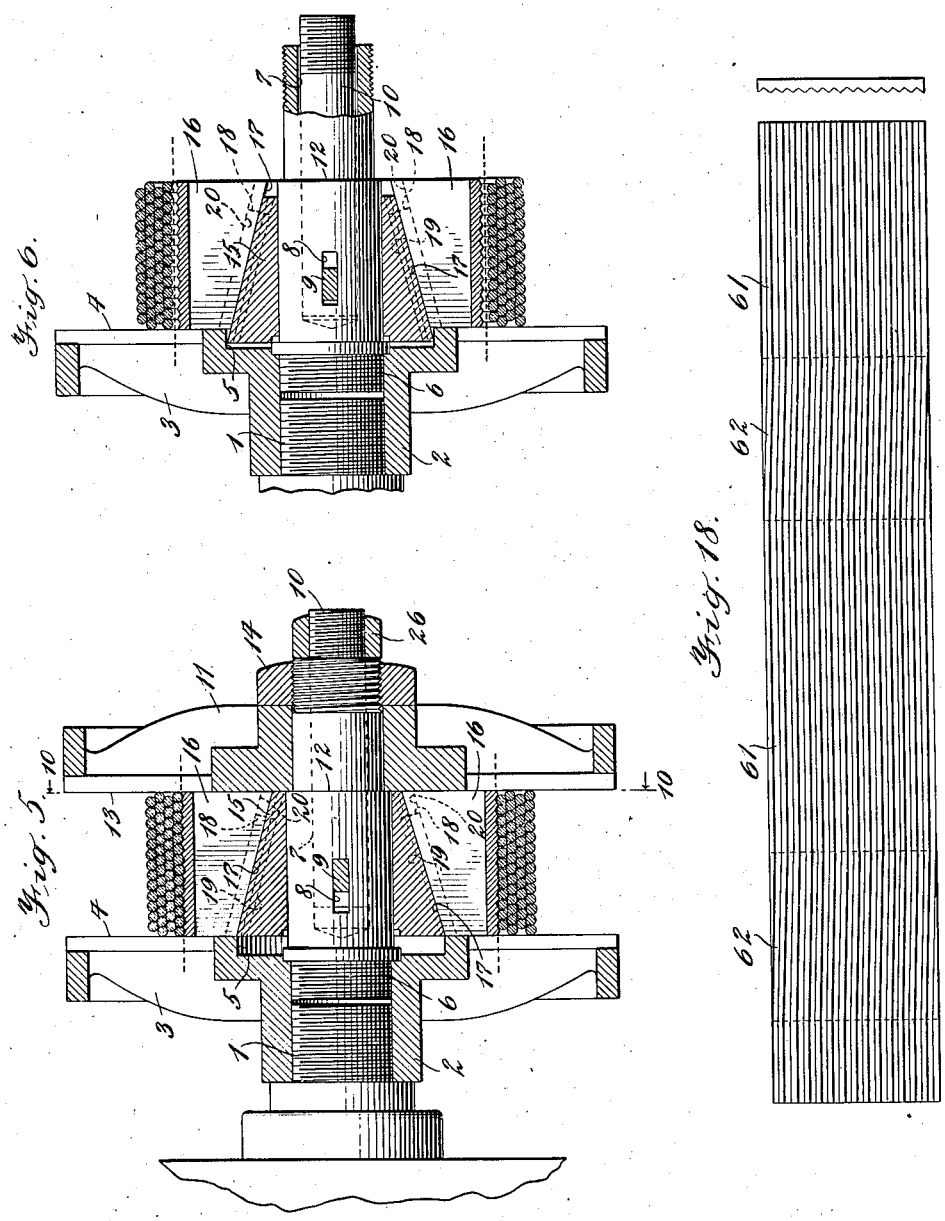

A. D. SCOTT.
METHOD OF WINDING AND THE PRODUCT THEREOF.
APPLICATION FILED AUG. 13, 1912.

1,167,722.

Patented Jan. 11, 1916.
5 SHEETS—SHEET 4.

Witnesses:

Archibald D. Scott  Inventor
By his Attorneys

A. D. SCOTT.
METHOD OF WINDING AND THE PRODUCT THEREOF.
APPLICATION FILED AUG. 13, 1912.

1,167,722. Patented Jan. 11, 1916.
5 SHEETS—SHEET 5.

Witnesses:

Inventor
Archibald D. Scott
By his Attorneys

UNITED STATES PATENT OFFICE.

ARCHIBALD D. SCOTT, OF JERSEY CITY, NEW JERSEY, ASSIGNOR TO VARLEY DUPLEX MAGNET COMPANY, OF JERSEY CITY, NEW JERSEY, A CORPORATION OF NEW JERSEY.

METHOD OF WINDING AND THE PRODUCT THEREOF.

1,167,722.  Specification of Letters Patent.  Patented Jan. 11, 1916.

Original application filed September 27, 1910, Serial No. 584,040. Divided and this application filed August 13, 1912. Serial No. 714,777.

*To all whom it may concern:*

Be it known that I, ARCHIBALD D. SCOTT, a citizen of the United States, residing in Jersey City, in the county of Hudson and State of New Jersey, have invented certain new and useful Improvements in Methods of Winding and the Product Thereof, of which the following is a specification.

My invention broadly and generally relates to new and useful improvements in methods of winding and the winding produced thereby, and more particularly relates to the production of windings substantially in coil form adapted for use in the electrical arts, such for instance as the windings for the field magnets of dynamos.

This application is a division of my pending application Serial Number 584,040, filed in the United States Patent Office September 27, 1910.

The invention consists in the method of procedure and the product thereof to be fully described hereinafter, and the novelty of which will be particularly pointed out and distinctly claimed.

Figure 1:
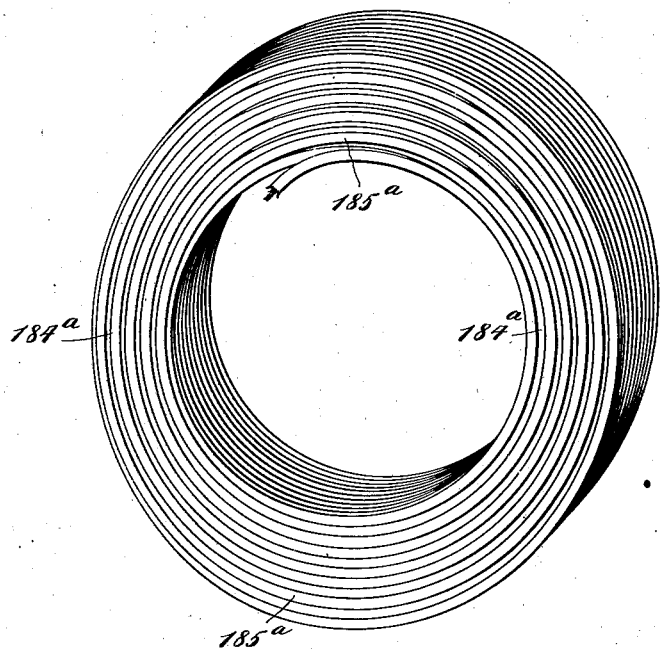
Figure 2:
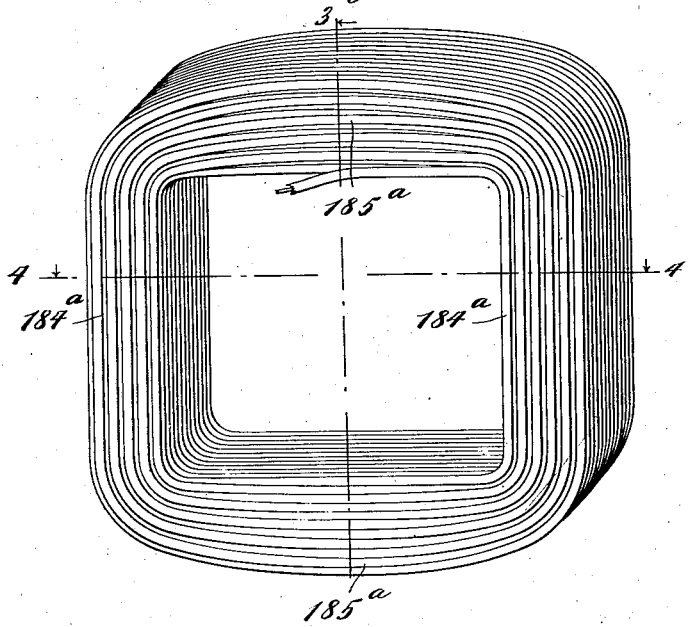
Figure 9:
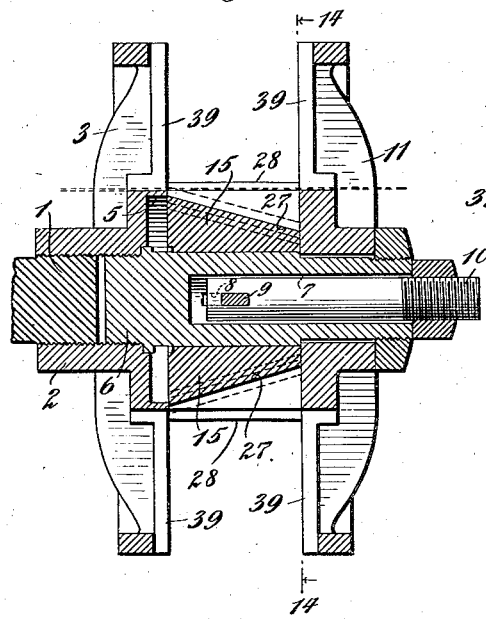
Figure 10:
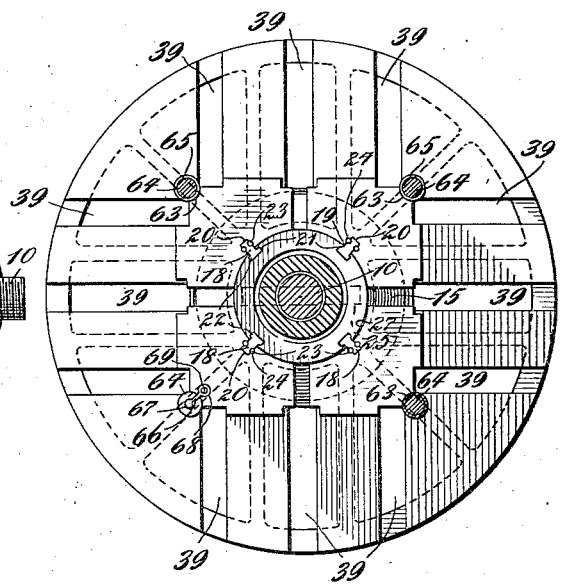
Figure 11:
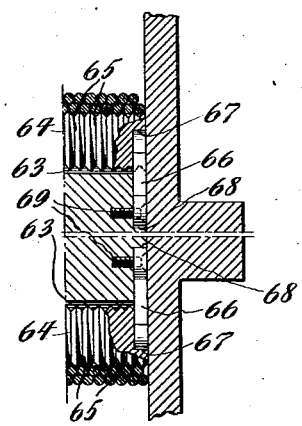
Figure 12:
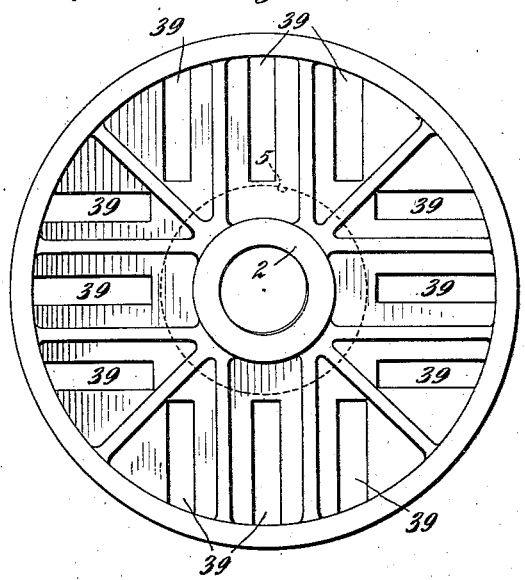
Figure 13:
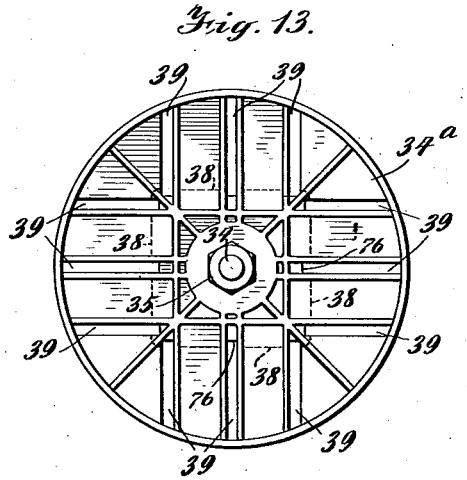
Figure 14:
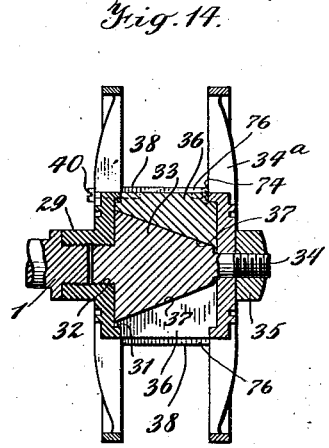
Figure 17:
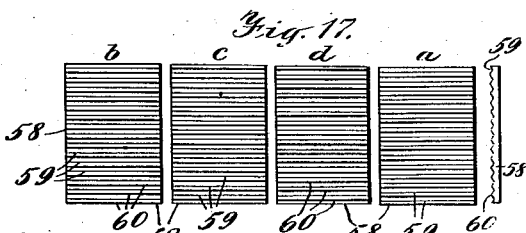
Figure 15:
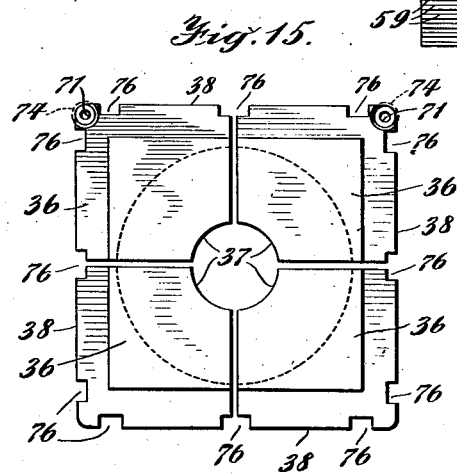
Figure 16:
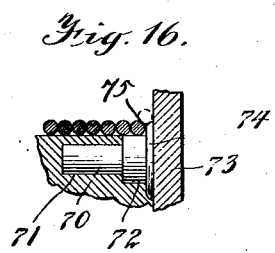

I have fully and clearly illustrated my invention in the accompanying drawings to be taken as a part of this specification and wherein:

Figure 1 is a view in perspective of a substantially round winding produced in accordance with my invention. Fig. 2 is a view in perspective of a polysided winding also produced in accordance with my invention: Fig. 3 is a section on the line 3—3 of Fig. 2: Fig. 4 is a section on the line 4—4 of Fig. 2: Fig. 5 is a vertical longitudinal section through a mandrel for holding and forming a round winding: Fig. 6 is a vertical longitudinal section through the mandrel shown in Fig. 5, showing the same in condition to permit detachment of the coil therefrom: Fig. 7 is a section on the line 10—10 of Fig. 5: Fig. 8 is a detail view of one of the filler blocks with a foundation guide section thereon: Fig. 9 is a longitudinal vertical section through a form of mandrel for producing polysided windings: Fig. 10 is a section on the line 14—14 of Fig. 9: Fig. 11 is an enlarged detailed view of a portion of the mandrel shown in Figs. 9 and 10, showing the strand guiding means employed in this form of mandrel: Fig. 12 is a view in end elevation of one of the end plates for the mandrel: Fig. 13 is a view in end elevation of another form of mandrel: Fig. 14 is a vertical central section through the mandrel shown in Fig. 13: Fig. 15 is a view in end elevation of the filler blocks used in connection with the mandrel shown in Fig. 14: Fig. 16 is a detail view in section of a portion of the mandrel shown in Figs. 14 and 15, showing a form of strand guide employed in connection therewith: Fig. 17 is a development of a foundation guide for receiving and guiding the windings on the mandrel: Fig. 18 is a development of another form of the foundation guide.

In order that my method will be the more fully understood, I will first proceed to describe the mechanical means or mechanism by which it is practised.

1 designates a spindle or center-piece upon which the parts of the mandrel are assembled and held during the winding operation. This spindle may form part of a machine such as described in my said pending application, or it may be driven by any suitable means, not shown.

Threaded onto the end of the driving spindle 1 is a hub member 2 supporting a flange plate 3, the same having a smooth inner plane face as at 4 except at its central portion where it is formed with an annular recess or pocket 5.

6 designates a cylindrical core-piece which is threaded into the hub 2 in longitudinal alinement with the shaft 1, said core-piece having a longitudinal bore 7 intersected by a transverse slot 8 extending entirely across and through the core-piece. Projecting through this core-piece 6 is a cross key 9, adapted to be moved back and forth in the slot 8 lengthwise of the core-piece, said key being operable by a plunger 10, slidably disposed within the bore of the core-piece. Mounted on the core-piece is a second flange plate 11 spaced from the plate 3 by a shoulder 12 on the core-piece against which it abuts, said second plate having a smooth inner plane face 13, said flange plates defining a space about the core-piece within which the winding is to be formed. The plate 11 is held in place in engagement with the shoulder 12 by a clamping nut 14 threaded onto the end of the core-piece. Slidable on the core-piece between the plates 3 and 11 is a collar 15 frusto conical in form and having its larger end toward the plate 3, and its smaller end toward the plate 11. The diameter of the larger end of the collar is such that it may be received by the recess 5 in the plate 3.

Mounted on and supported by the collar is a plurality of filler blocks 16 having their outer faces parallel with the axis of rotation of the spindle 1 and each has an inner inclined face 17, curved to rest on the surface of the collar and said filler blocks being each slidably connected to said collar by a key 18 seated in alining grooves 19 and 20, formed respectively in the collar and filler block. The keys may be formed to connect the collar and filler pieces to prevent lateral or radial separation thereof when winding is removed. For this purpose the grooves in the collar may be undercut at 21 to receive lateral projections 22 on the keys, the keys being secured in the grooves of the blocks by locking pins 23 set in alining recesses 24 in the sides of the keys and the side walls of the block grooves.

The cross-key 9, heretofore described, projects at its ends beyond the core-piece into recesses 25 in the collar 15, and it will be seen that when the said key is moved lengthwise of the slot 8 the collar will cause the filler blocks to move radially toward or away from the core-piece accordingly as the collar is moved toward the end plate 3, or the end plate 11. The filler blocks are held against movement lengthwise of the shaft by the end plates. When the winding is being formed the parts are in the position shown in Fig. 5, the collar 15 being moved against the end plate 11, any means being provided for this purpose such, for instance, as the nut 26 threaded onto the end of the plunger and abutting the end of the core-piece 6. After the winding is formed, the nut 26 is turned to release the plunger and the latter is moved in to slide the collar 15 lengthwise of the shaft to permit the filler blocks to collapse, the rear end of the collar moving into the recess in the plate 3, and the nut 14 is then removed to permit the flange plate 11 to be detached, so that the winding may be drawn from the mandrel.

In Figs. 9 to 12 I have shown a mandrel for use in forming a polysided winding, in the present instance a winding having four sides. In this form of the mandrel I employ a number of features which are in common with those described in the form shown in Figs. 5 to 8. In this form of the mandrel, the main portions of the mandrel may be constructed in substantially the same form and arrangement as in the form shown in Figs. 5 to 8, the end plates, the core-piece and the sliding collar, together with a plunger for operating the latter, being all the same, as shown in said figures. The difference between these two forms resides in the construction of the filler blocks; in the present instance, four blocks being employed, each having an inner curved inclined surface 27 to rest on, and conform with the outer surface of the sliding collar, the filler blocks being secured in position by keys in the same manner as in the form first described. These filler blocks are each provided with outer straight faces 28, which are substantially at right angles to each other, so that when the filler blocks are assembled upon the collar, they combine to form a substantially rectangular body. The operation of this mandrel in supporting and releasing the winding, is substantially the same as that of the form first described, the collar being shifted toward the recessed plate to withdraw the filler blocks and pulled toward the end of the core-piece to expand the blocks.

In Figs. 13, 14, 15 and 16 I have shown another form of the mandrel for winding polysided coils. In this construction, the hub 29 of a flange plate 30 is threaded onto the spindle 1, said end plate having a recess 31, at its central portion, and threaded into the hub 32, in alinement with the spindle 1 is a core-piece 33, which is conical in shape, the base of the cone being located within the recess in the end plate, and the opposite end of said core-piece having a threaded shank 34 to receive an outer end plate 34ª, which is held in place on the core-piece by a nut 35. Arranged on the conical portion of the core-piece between the end plates, is a plurality of filler blocks 36, shown as being four in number and each provided with an inclined inner curved surface 37 to rest on the curved surface of the cone. The core-pieces are formed with outer surfaces 38 at right angles to each other, and the arrangement is such that when the mandrel is assembled, the faces 38 of the core-pieces aline to provide a substantially rectangular body to receive the turns of the magnet winding. In all of the forms of the mandrel described, the flange plates are provided with a plurality of slots 39, through which tying bands may be passed in order to tie the layers of the winding together to prevent separation thereof when the winding is removed from the mandrel.

In Fig. 14 one of the filler blocks is shown detachably secured to the end plate 30 by a bolt 40 so that said bolt constitutes a bracket for the support of the winding when the end plate 31 is removed.

In practicing my method, I provide the mandrel, whether it is designed to make round windings or polysided windings, with means whereby the turns of the layers constituting a winding, will be arranged in regular form so that alternate layers are counterparts of each other throughout the entire winding, the result being that I provide a completed article which is much more compact for a given weight of wire than any winding which has been produced heretofore, as far as I am aware, and which not only makes a winding which is much more compact, but results in a great saving of wire, which, of course, in copper windings is important. In order to arrive at this result, I provide the mandrel with means whereby the first layer of the winding is laid between the flanges of the mandrel with great precision, preferably so that the axes of the turns are equidistant from each other, this winding serving then as a guide for the next layer and so on throughout the article produced.

Before proceeding with a detail description, I believe the method will be better understood if it is borne in mind that the procedure is based on the fact that the distance from the flange of any wire which is the nearest one of its layer must be either zero or one-half the diameter of the strand, in order that the arrangement of strands in layers will be such that it is repeated as layer after layer is wound on the core.

In Fig. 17, I have shown one form of guide which consists of a plurality of curved plates 58 adapted to be laid on the outer surface of the mandrel, of the form shown in Figs. 5 to 8, for making a round winding, these plates being formed with a plurality of grooves 59 and intervening ridges 60, which grooves are to receive the strands of the initial winding, which strands are separated by the ridges. Of course, in making a winding of this character, the strand is laid on the mandrel in the form of a coil, and in order that the strand be guided laterally so as to take substantially the direction of a coil, two of the plates, as for instance the two middle ones as shown in the diagram, are formed with a half groove adjacent the starting flange, while the two outer plates are formed with a whole groove adjacent the starting flange. If now, for instance, the start of the winding is against the end plate in one of the whole grooves of the plate a, it will follow the same as the mandrel revolves, until it reaches the alining whole groove in the plate b, which it follows until it reaches the first whole groove in the plate c when it will be forced laterally into said whole groove and follow the same. The strand follows this whole groove in the plate c until it reaches the plate d when it likewise follows the whole alining groove therein. The winding then continues until the second whole groove in the plate a reaches the strand when the strand will drop into the latter and follow this whole groove and the corresponding alining groove in the plate b, which it follows until it reaches the second whole groove in the plate c, which, as shown in Fig. 17, is offset laterally the distance of a half a groove from the second whole groove in the plate b, which continues throughout the entire winding, the strand being successively offset from the plate d onto the plates a and b and then offset from the latter onto the plate c. The points of offset, that is, between the plates d and a, and between b and c, are preferably arranged at diametrically opposite points on the mandrel so that each half turn of a layer of the winding is offset a distance equal to one-half the diameter of the strand being wound. By this operation, under the influence of the guide described, every turn in the first layer is laid in exactly the same direction and form as any other turn, and the turns of the layer first formed, form a rigid guide in which the turns of the next layer are laid with the same accuracy as the first layer was forced to take by the foundation guide, and this continues throughout the winding. I prefer to form these plates separately instead of in a continuous piece for the reason that in making a round winding it is desirable to get as much of the winding as possible parallel with the flanges, and therefore, the offset must be as short as practicable. It will be seen that while each turn is offset twice in going around the mandrel, the portions between the offsets lie parallel to the end plate.

In Fig. 18, I have shown the foundation guide as being made in a continuous piece in substantially the same arrangement as shown in Fig. 17, except that I am unable to obtain the short offsets accomplished by the arrangement shown in Fig. 17. In Fig. 18, the foundation guide is shown developed in plan and embodies 4 zones, the cut being made through one of the zones so that in the figure shown, a portion of a zone appears at each end of the figure. In this embodiment two zones 61 are provided, each formed with a plurality of parallel grooves which run at right angles to the axis of rotation of the mandrel or parallel to the flat faces of the mandrel and flanges, the grooves of one of said zones being offset laterally from those of the other the distance of one half a groove, and said zones being joined at their ends by zones 62 of inclined grooves, each groove of which joins one of the straight grooves of one of the zones 61 with the next offset groove of the other zone 61. The arrangement may be stated to be practically the same as that shown in Fig. 17, except that the zones of parallel grooves are joined by zones of inclined grooves instead of being separated from each other. The result produced in the winding is substantially the same.

When the form of winding to be made is polysided, I preferably do not employ the guide plates shown in Fig. 17, or the continuous plate of Fig. 18, but may provide each of the outer angles which join the receiving faces of the filler blocks with a plurality of grooves or corrugations so that the wire or strand in passing from one face of a polysided mandrel to the other, will be guided by these corrugations. I prefer to form the filler blocks with a longitudinal groove 63 within which is placed a pin 64, which is of a length selected according to the length of the coil to be formed, said pin being provided with grooves 65, which are formed to correspond to the diameter of the wire to be wound. It will be understood that preferably there is a pin arranged at the outer angle of each filler piece, in the embodiment shown in the drawings said pin being of a length equal to that of the filler block and abutting the end plates of the mandrel at their outer ends. Each of these pins is provided with a plurality of annular grooves and intervening ridges, the grooves being intended to receive and guide the strand as it turns the angle of the filler piece. It will be understood that there is a separate set of pins to be used for each winding, the same being selected according to the length of the coil and diameter of the wire. All four of the pins are not the same in the arrangement of the grooves therein in the embodiment heretofore described. For instance, the first two are arranged with a whole groove at the starting point of the winding against the end plate, while the second two would be provided with a half groove at the starting end. For instance, suppose the first two pins were to start adjacent the flange with a full groove and to end with a full groove, then the second two pins would start and finish with half grooves at their ends. If the starter pins should commence with a full groove and end with a half groove, then the finishing pins would start with a half groove at one end and end with a full groove at the opposite end. The arrangement above described is for producing a winding having two sets of crossovers, but should it be desired to produce a winding having but one set of crossovers, the pins will in that event be all alike.

It will be understood that the distance between the apexes of the ribs between the grooves is equal to the diameter of the wire to be wound on any particular set of pins, and that a half groove will be equal to one-half of the diameter of the wire. In using the pins, supposing a winding is started in the full groove adjacent one of the end plates, as the mandrel is turned the wire passes to the full groove of the next pin adjacent the end plate and then comes to one of the pins which has a half groove adjacent the end plate; the wire cannot enter the half groove and must take the next full groove which is adjacent to the half groove so that the wire is deflected laterally across the face of the mandrel, a distance equal to one-half its diameter. As the revolution of the mandrel continues, the wire passes to the first full groove of the fourth pin and then reaches the second full groove of the first pin which will again cause the wire to deflect laterally a distance equal to its diameter to the right of the turn first made and this continues until the whole face of the mandrel between the end plates is covered with a layer. If the starter pins terminate with a full groove, then the finishing pins terminate with a half groove and after the first layer has been completed, the strand will ride up on the half groove ends of the finishing pins adjacent the flange and constitute the first turn of the return layer, which is to lay upon the top of the first layer. Then during the return of the wire the return layer is guided by the first layer laid on the mandrel.

The pins may be secured in position in any suitable manner, as for instance by a double headed securing device 66, one head of which is seated in a recess 67 at the end of the pin and the other end of which is seated in a recess 68 in the end of the filler piece, said last mentioned head being secured in position if desired by a screw 69.

In the form of the mandrel shown in Figs. 13 to 16 respectively, I may employ a different form of means for starting the first layer so that it constitutes a guide for succeeding layers. In this form I do not use a guide extending entirely across the face of the mandrel but employ a device which makes the first turn take a determined course, so that the subsequent turns, when laid against the same, will take a corresponding course across the face of the mandrel. In this form of invention I employ a guide or projection secured to the mandrel and extending beyond the receiving face thereof, a distance equal to the diameter of the wire and of a thickness equal to one-half the diameter of the wire, said device being arranged flush against one of the end plates. This device may take a number of forms, but I prefer to employ a pin 70 seated in a recess 71, in the end of two of the adjacent filler blocks, said pin having an enlarged head 72 which abuts the end plate 73, and projects beyond the face of the mandrel between the end plates, said head having a rounded surface as at 74, so that it practically constitutes, in effect, a half strand of wire laid against the end plate. When the wire is then wound on the mandrel, it will be held away from the end plate a distance equal to one-half its diameter by the projecting head of this pin, at two of the corners of the mandrel, but will lie against the end plate at the other corners of the mandrel. As the coil is wound, all of the succeeding turns of the first layer will be correspondingly laid and the turns of the second layer will be guided by the turns of the first layer, the final turn resting in the groove formed by the head 74, and the next adjacent turn of the first layer, 75, the head 74 preventing the next to last turn of the second layer from forcing the end turn of the first layer away from the second turn of the first layer.

The filler blocks for the mandrel may each be formed with a longitudinal rabbet 76, which when they are assembled coincide to form grooves longitudinally of the mandrel through which binding strips may be passed between the winding and the mandrel.

Instead of using a rigid metal guide (Figs. 17 and 18) a guide may be formed of thick paper or other suitable material and wrapped around the shell of a core or mandrel and formed to guide the wire, the guide being left in place in the coil when the latter is removed. Such guide might take the form of a continuous strip as in Fig. 18, or several short strips, as in Fig. 17.

In Figs. 1, 2, 3 and 4 I have shown the product of the method heretofore described in Fig. 1, the form being that produced on a round mandrel, and in Figs. 2, 3 and 4 the form of completed winding shown being that produced on a polysided mandrel. As shown the product is formed of a plurality of layers, each of which is substantially in coil form, but two of the opposite sides 184ª are of less diameter or thickness than the other opposite sides 185ª, this being due to the fact that all of the crossings of the layers take place on the sides 185ª, and the wires lie parallel to each other throughout the sides 184ª, and substantially at right angles to the axis of the coil. By reference to Fig. 3, which is a section taken through the thicker sides, it will be seen that the thickness of the thicker side is the product of the diameters of one of the strands by the number of the layers, while by reference to Fig. 4, which is a section through the thinner sides, it will be seen that while there is the same number of layers, the turns of one layer are located between the turns of the next layer so that the thickness of the sides 184ª will be less than the product of the diameter of the strand by the number of layers. This formation is particularly advantageous as a winding with the required amount of wire is produced, but two of the sides of the winding are reduced to the smallest possible diameter, which is of great assistance in the assembling of the coils on the pole pieces of an electric machine when the same are close together, as the reduced sides of the windings permit the latter to freely pass one another when being placed on the pole pieces.

The form of the mandrel and the guides therefor shown in Figs. 5, 6, 7, 8, 9, 10, 12, 17 and 18 are made the subject matter of my co-pending application Serial No. 670,794, filed January 12, 1912, while the embodiment shown in Figs. 13, 14, 15 and 16 is made the subject-matter of my co-pending application Serial No. 718,812, filed September 6, 1912.

What I claim and desire to secure by United States Letters Patent is:—

1. A winding or coil in which the turns of the layers lie substantially at right angles to its axis and parallel to one another on two opposite side portions, the turns of each of the layers after the innermost on said two sides being embedded between the turns of the next underlying layer so that the thickness of each of said sides is less than the diameter of the strand multiplied by the number of layers, while on the opposite side portions of the winding between said first-named two side portions, the turns of each layer run oblique to the axis, the oblique turns of each layer crossing and being superimposed on the oblique turns of the next underlying layer, whereby the thickness of the coil on the sides containing the oblique and superimposed turns is thicker than said first-named side portions.

2. A winding in which the turns of the layers are offset laterally longitudinally thereof twice in a revolution of a winding, each offset being to the extent of substantially half the diameter of the wire being wound, and are substantially at right angles to its axis between said offsets, and parallel to each other.

3. The method of winding in coil form on a mandrel which consists in laying a strand on the mandrel substantially at right angles to the axis of rotation for a portion of a turn and positively holding said portion in said position, continuing the winding by offsetting the said turn laterally and obliquely in the direction in which the turns of the layer are successively laid, and positively holding the oblique portion of the turn in said position and then again carrying the strand substantially at right angles to the axis of rotation, and repeating the said operations for all the subsequent turns of the layer, and employing the grooves formed between said turns to positively determine the position of the turns of subsequent layers in conformation to said first layer.

4. The method of winding which consists in winding the strand on a mandrel or form having end flanges, and positively placing and holding, independently of the side engagement of adjacent turns, all the turns in fixed predetermined positions in such manner that on two opposite sides of the axis at each end flange the end turns of successive layers are alternately, parallel to the flange in contact therewith, and parallel to the flange distant therefrom one-half the diameter of the strand.

5. The method of winding which consists in winding the strand on a mandrel or form having end flanges, and positively placing and holding, independently of the side engagement of adjacent turns, all the turns in fixed predetermined positions in such manner that on two opposite sides of the axis at each end flange the end turns of successive layers are alternately, parallel to the flange in contact therewith, and parallel to the flange distant therefrom one-half the diameter of the strand, and so that one part of each end turn touches the flange and the part of the same turn on the opposite side of the axis of the winding will be distant from the flange one-half the diameter of the strand.

6. The method of winding in coil form which consists in laying a strand substantially parallel to the direction of rotation of a mandrel throughout one portion of the receiving surface of the mandrel for one portion of a turn, offsetting the turn laterally in the direction in which the turns are laid throughout a next adjacent portion of the receiving surface of the mandrel, laying the strand substantially parallel to the direction of rotation throughout another portion of the receiving surface of the mandrel opposite to said first-named portion, and again offsetting it laterally through that portion of the mandrel opposite that occupied by the first-named offset.

7. The method of winding in polysided coil form which consists in laying a strand to form a layer on a polysided mandrel having end flanges and during the winding positively holding the portion of the initial turn on one face of the mandrel so that it takes a position against a flange or one-half the diameter of the strand from the flange at the adjacent corners of the mandrel, and continuing the winding, and holding the remaining turns at the same adjacent corners of the mandrel so that said turns take a predetermined definite position relative to the first turn.

8. The method of winding four-sided windings which consists in winding in coil form on a four-sided mandrel, laying a strand substantially parallel to the direction of rotation throughout one side of the mandrel for one portion of a turn, offsetting the turn laterally in the direction in which the turns are laid throughout the next adjacent face of the mandrel, laying the strand parallel to the direction of rotation throughout the face of the mandrel opposite to the first-named face, and offsetting it laterally throughout the remaining face.

In testimony whereof I have hereunto signed my name in the presence of two subscribing witnesses.

ARCHIBALD D. SCOTT.

Witnesses:
M. E. McNINCH,
C. G. HEYLMUN.

---

It is hereby certified that in Letters Patent No. 1,167,722, granted January 11, 1916, upon the application of Archibald D. Scott, of Jersey City, New Jersey, for an improvement in "Methods of Winding and the Product Thereof," an error appears in the printed specification requiring correction as follows: Page 2, line 127, for the word "bolt," second occurrence, read *block;* and that the said Letters Patent should be read with this correction therein that the same may conform to the record of the case in the Patent Office.

Signed and sealed this 1st day of February, A. D., 1916.

[SEAL.]

J. T. NEWTON,
*Acting Commissioner of Patents.*

Cl. 175—21